United States Patent
Wei et al.

(10) Patent No.: US 6,514,594 B1
(45) Date of Patent: Feb. 4, 2003

(54) FLUORESCENT POLYMERIC ARTICLES HAVING SCREENING LAYER FORMED FROM U.V. LIGHT ABSORBING POLYMER

(75) Inventors: Guang-Xue Wei, Northbrook, IL (US); Drew J. Buoni, Chicago, IL (US); Kimberly A. Dockus, Bloomingdale, IL (US)

(73) Assignee: Avery Dennison Corporation, Pasadena, CA (US)

( * ) Notice: Subject to any disclaimer, the term of this patent is extended or adjusted under 35 U.S.C. 154(b) by 135 days.

(21) Appl. No.: 09/710,560

(22) Filed: Nov. 9, 2000

Related U.S. Application Data

(60) Provisional application No. 60/247,438, filed on Nov. 9, 2000, and provisional application No. 60/247,439, filed on Nov. 9, 2000.

(51) Int. Cl.[7] .................. C08F 263/02; B32B 25/08; B32B 25/14; B32B 27/16; B32B 27/28; G03G 15/06

(52) U.S. Cl. .................. 428/141; 428/40.7; 428/690; 428/917; 430/56; 430/60; 430/68; 430/75; 525/92 E; 525/89; 525/451; 525/461; 525/462; 525/466

(58) Field of Search .............. 428/141, 40.7, 428/690, 917; 430/56, 60, 68, 75; 525/92 E, 89, 451, 461, 462, 466

(56) References Cited

U.S. PATENT DOCUMENTS

| | | |
|---|---|---|
| 2,999,835 A | 9/1961 | Goldberg |
| 3,028,365 A | 4/1962 | Schnell et al. |
| 3,153,008 A | 10/1964 | Fox |
| 3,945,967 A | 3/1976 | Jaquiss |
| 4,025,159 A | 5/1977 | McGrath |
| 4,115,386 A | 9/1978 | Gall et al. |
| 4,230,858 A | 10/1980 | Gall et al. |
| 4,259,458 A | 3/1981 | Robeson |
| 4,286,075 A | 8/1981 | Robeson et al. |
| 4,286,094 A | 8/1981 | Hoch et al. |
| 4,374,239 A | 2/1983 | Berger et al. |
| 4,486,363 A | 12/1984 | Pricone et al. |
| 4,505,967 A | 3/1985 | Bailey |
| 4,598,130 A | 7/1986 | Robeson et al. |
| 4,601,861 A | 7/1986 | Pricone et al. |
| 4,618,518 A | 10/1986 | Pricone et al. |
| 4,643,937 A | 2/1987 | Dickinson et al. |

(List continued on next page.)

FOREIGN PATENT DOCUMENTS

| | | |
|---|---|---|
| JP | 216042 | 2/1990 |
| WO | WO 9803577 | 1/1998 |
| WO | WO 9920688 | 4/1999 |
| WO | WO9921937 | 5/1999 |
| WO | WO9948961 | 9/1999 |
| WO | WO0026275 | 5/2000 |

OTHER PUBLICATIONS

C.T. Wright et al., "Gas sorption and transport in UV–irradiated polyarylate copolymers based on tetramethyl bisphenol–A and dihydroxybenzophenone," *Journal of Membrane Science* 124 (1997), pp. 161–174.

(List continued on next page.)

*Primary Examiner*—Duc Truong
(74) *Attorney, Agent, or Firm*—Jones, Day, Reavis & Pogue

(57) ABSTRACT

A fluorescent article is disclosed in which a U.V. light screening layer comprising a polymer having in its backbone repeating units of a U.V. light absorbing moiety, or a moiety capable of being transformed by Photo-Fries rearrangement into a U.V. light absorbing moiety, is disposed in operative screening relation to a layer containing a fluorescent colorant. The U.V. light screening layer affords surprisingly improved fluorescence protection as compared to prior U.V. light screening layers having only U.V. light absorbing additives.

64 Claims, 3 Drawing Sheets

U.S. PATENT DOCUMENTS

| | | |
|---|---|---|
| 4,672,089 A | 6/1987 | Pricone et al. |
| 4,937,287 A | 6/1990 | Dean |
| 5,034,502 A | 7/1991 | Hirose et al. |
| 5,124,413 A | 6/1992 | Luise |
| 5,156,863 A | 10/1992 | Pricone et al. |
| 5,316,838 A | 5/1994 | Crandall et al. |
| 5,387,458 A | 2/1995 | Pavelka et al. |
| 5,470,502 A | 11/1995 | Hahn et al. |
| 5,605,761 A | 2/1997 | Burns et al. |
| 5,672,643 A | 9/1997 | Burns et al. |
| 5,674,622 A | 10/1997 | Burns et al. |
| 5,710,197 A | 1/1998 | Fischer et al. |
| 5,736,596 A | 4/1998 | Heitz et al. |
| 5,754,337 A | 5/1998 | Burns et al. |
| 5,808,073 A | 9/1998 | Böhm et al. |
| 5,920,429 A | 7/1999 | Burns et al. |
| 5,942,585 A | 8/1999 | Scott et al. |
| 6,001,936 A | 12/1999 | Barrera et al. |
| 6,005,059 A | 12/1999 | Scott et al. |
| 6,011,124 A | 1/2000 | Scott et al. |
| 6,037,424 A | 3/2000 | Scott et al. |
| 6,043,322 A | 3/2000 | Scott et al. |
| 6,103,796 A | 8/2000 | Staniek et al. |
| 6,110,566 A | 8/2000 | White et al. |

OTHER PUBLICATIONS

Technical & Molding Catalogue of U–Polymer, Unitika America Corp, Japan.

D. L. Love, "How Polyarylates Resist Weathering, "*Modern Plastics*, Mar. 1984. pp. 60–62.

Robeson et al., "History of Polyarylates," *High performance Polymers: Their Origin and Development*, pp. 95–103.

Yan et al., "Thermal and Photo Stability of Polyarylates—Styrylpyridine–Based Polymers," *Reactive Oligomers*, ACS Symposium Series, 187th Meeting of the American Chemical Society, St. Louis, MO Apr. 8–13, 1984.

Two page brochure on polyarylate made by Westlake Plastics Company, Lenni, PA.

Westlake Product Bulletin on "Ardel (polyarylate)"of Westlake Plastics Company, Lenni, PA.

Two page articles on Polyarylate, Chapter 28, Plastics Design Library.

Legend:

UV-Light Absorbing Polymer Layer

Colored Layer

FLUORESCENT POLYMERIC ARTICLES HAVING SCREENING LAYER FORMED FROM U.V. LIGHT ABSORBING POLYMER

CROSS-REFERENCE TO CO-PENDING APPLICATIONS

Reference is made to the following applications, each of which is co-pending with the instant application: U.S. Provisional Serial No. 60/247,438, filed Nov. 9, 2000; U.S. Provisional Serial No. 60/247,439, filed Nov. 9, 2000; U.S. Ser. No. 09/710,510, filed Nov. 9, 2000 now pending; and U.S. Ser. No. 09/709,921, filed Nov. 10, 2000 now abandoned.

FIELD OF THE INVENTION

The present invention relates generally to fluorescent multi-layer polymeric articles having an ultraviolet light screening layer to protect the fluorescence color stability of a fluorescent layer. More particularly, the invention is directed to articles, preferably comprising a plurality of retroreflective elements, in which a fluorescent polymeric layer is protected by a polymeric ultraviolet light screening layer fabricated from a U.V. light absorbing polymer, or a polymer capable of re-arrangement to a U.V. light absorbing polymer.

BACKGROUND OF THE INVENTION

Retroreflective sheeting is widely used for traffic and roadway safety signs. Such sheeting is typically provided as a polymeric monolayer or multilayer sheeting material having thousands of retroreflective elements, such as microprismatic comer cubes or glass microspheres, that reflect incident light. It is well known to incorporate one or more fluorescent dyes into a retroreflective sheeting in order to enhance the visibility of articles such as road signs manufactured from such sheeting material. Fluorescent colors enhance visual contrast, which makes fluorescent colored materials more conspicuous than nonfluorescent materials. Unfortunately, most fluorescent colorants have poor ultraviolet light stability. In some cases, fading of fluorescent sheeting due to ultraviolet light exposure can occur within six months. The loss of fluorescence caused by ultraviolet light exposure dramatically shortens the useful life of fluorescent traffic and roadway signs. Accordingly, there is a need in the art to stabilize fluorescent colorants in plastics and to find a means to reduce the fading of fluorescent dyes in order to provide articles such as retroreflective road signs that can remain in service for significantly longer periods.

To enhance the outdoor durability of fluorescent retroreflective sheeting, an ultraviolet light screening layer is often used to protect the base fluorescent polymeric matrix layer from the effects of ultraviolet radiation. Traditionally, the U.V. light screening layer is made by incorporating U.V. light absorbing compounds into a transparent polymer matrix. Japan Kokai No. 2-16042, Application No. 63-165914 (Koshiji et al.) and U.S. Pat. No. 5,387,458 (Pavelka et al.) each disclose fluorescent articles consisting of an ultraviolet screen layer disposed in front of a fluorescent layer. According to these references, the screening layer contains substantial amounts of ultraviolet light absorbing compounds, which absorb a defined range of U.V. light (wavelengths from 290 to 400 nm).

Such prior art multilayer structures in which a U.V. light absorbent additive-treated screening layer is disposed in front of a layer containing a fluorescent dye can give rise to several difficulties. One problem is that the U.V. light absorbent additives incorporated into the U.V. light screening layer may leach out with time, because most U.V. light absorbing compounds are relatively small molecules and the U.V. light screening layer is typically quite thin. As a result of this phenomenon, the screening layer may lose its protective function, and the fluorescent colorants in the fluorescent layer will quickly fade and lose their fluorescence when exposed to ultraviolet light. A further problem with the U.V. light absorbent additive-treated screening layers is that U.V. light absorbing compounds present therein can diffuse or migrate into the fluorescent layer. If the U.V. light absorbing compound is not carefully selected, this diffusion can actually accelerate the fading of the fluorescent colorant even though the diffused compound is one that absorbs U.V. light. The problem of additive migration requires that a U.V. light absorbing additive incorporated into a screening layer be carefully matched to the fluorescent colorant so as to minimize any tendency of the migrating U.V. light absorber to affect the color and fluorescence of the articles. The implication that one may randomly select any U.V. absorber capable of blocking most of U.V. light below 400 nm wavelength (see, e.g., Japan Kokai No. 2-16042, Application No. 63-165914 (Koshiji et al.) and U.S. Pat. No. 5,387,458 (Pavelka et al)) fails to take into account the potential interaction between the U.V. absorber in the screening layer, and the fluorescent dye(s) present in the colored layer.

Based on the problems described above, there is a strong need in the art for polymeric articles in which an ultraviolet light screening layer can provide longer lasting U.V. light protection to a polymeric layer containing a fluorescent dye. Moreover, there is a need in the art of manufacturing of such articles to be able to select a fluorescent colorant without regard to the type of U.V. light absorbing material present in the screening layer, and vice versa.

In view of the foregoing, a general object of the present invention is to provide a polymeric multilayer article in which a polymeric ultraviolet light screening layer is arranged in protective laminar fashion (with or without intervening layers) with a fluorescent dye-containing layer in order to provide a much higher degree of fluorescence and color stability in the dye-containing layer than is currently afforded by conventional U.V. light screening layers comprising a polymer and a U.V. light absorbing additive.

Another object of the invention is to provide a polymeric multilayer retroreflective article in which an ultraviolet light screening layer is fabricated from a polymer capable of absorbing ultraviolet radiation such that the retroreflective article can be used to fabricate fluorescent, outdoor-weatherable products that have greater durability in terms of both color and fluorescence.

Yet another object of the invention is to provide a polymeric multilayer retroreflective article in which an ultraviolet light screening layer is disposed in protective relation to a fluorescent layer having cube comers formed on a surface thereof, and the ultraviolet light screening layer is fabricated from one or more U.V. light absorbing polymers or polymers capable of undergoing re-arrangement to an ultraviolet light absorbing polymer.

Still a further object of the invention is to provide a polymeric retroreflective article in which an ultraviolet light screening layer fabricated from a U.V. light absorbing polymer, or from a polymer capable of re-arrangement to a U.V. light absorbing polymer, can be attached to, or otherwise arranged in protective laminar configuration with, a polymeric layer comprising a fluorescent dye to reduce loss of fluorescence upon exposure of the article to ultraviolet radiation, even if no additional U.V. light absorbing additives and/or light stabilizers are used in the screening layer and/or the colored layer.

Yet another object of the invention is to provide retroreflective sheeting material in which an enhanced ultraviolet light screening layer, fabricated from a U.V. light absorbing polymer, or from a polymer capable of re-arrangement to a U.V. light absorbing polymer, can provide a remarkable degree of fluorescence protection to an underlying fluorescent layer, thereby extending the useful life of such retroreflective sheeting material significantly beyond that currently attainable using conventional screening layers containing U.V. light absorbing additives.

These and other objects will become apparent hereinafter to those skilled in the art.

SUMMARY OF THE INVENTION

The present invention results from our discovery that a U.V. light screening layer fabricated from a U.V. light absorbing polymer, and/or a polymer capable of undergoing re-arrangement to a U.V. light absorbing polymer, can provide a remarkable level of protection to the fluorescence and color durability of a polymeric layer containing a fluorescent colorant. The level of protection is superior to that afforded by U.V. light screening layers in which one or more conventional U.V. light absorbent additives (e.g., benzophenones and/or benzotriazoles, either with or without hindered amine light stabilizers, and the like) are merely added to a non-U.V. light absorbing polymeric resin. Although U.V. light absorbing resins have been known (e.g., polyarylates), it could not have been predicted that the use of such resins in a multilayer fluorescent retroreflective structure would afford such a surprising degree of U.V. protection compared to the U.V. additive-treated screening layers that have heretofore been used.

Accordingly, we have found that the objects stated above can be achieved in a multilayer, U.V. light protected article, preferably a sheeting material, comprising: (a) a polymeric layer comprising a fluorescent colorant; and (b) an ultraviolet light screening layer disposed over the colored layer and comprising either a U.V. light absorbing polymer, or a polymer which can undergo photo-Fries re-arrangement to a U.V. light absorbing polymer. More particularly, the polymeric resin used to fabricate the U.V. light screening layer comprises at least one polymer, or a mixture thereof, selected from the group consisting of (i) polymers having a polymeric backbone comprising the following repeating moiety A:

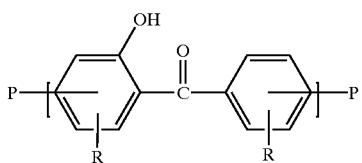

wherein R is a non-interfering substituent and P is the remainder of the polymer, and whereby the polymers are able to absorb ultraviolet light; and (ii) polymers having a polymeric backbone comprising the following repeating moiety B:

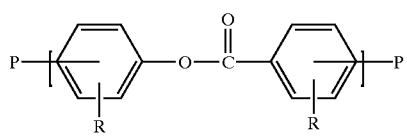

wherein R and P are as defined above; said moiety B being transformable to said moiety A by photo-Fries rearrangement, whereby said polymers comprising moiety B can undergo re-arrangement to ultraviolet light absorbing polymers comprising moiety A.

The term "non-interfering substituent" is intended to denote substituents which do not prevent the above-defined moieties from exhibiting U.V. light absorbent properties, or from undergoing photo-Fries rearrangement to U.V. light absorbing moieties.

The screening layer may also comprise a mixture of the moiety A and moiety B polymers. Without intending to be bound to any particular theory, the enhanced color and fluorescence protection offered by screening layers of the present invention is believed to result, at least in part, from the repeating U.V. light absorbing moieties being present directly in the backbone of the screening layer polymer, as distinguished from separate U.V. light absorbing compounds admixed with polymer.

The invention is further directed to a retroreflective sheeting material comprising a plurality of retroreflective elements, a U.V. light screening layer fabricated from a polymeric resin comprising polyarylate, and a polymeric layer comprising a fluorescent dye, and, optionally a polyarylate-containing resin.

The multi-layer article of the instant invention finds particular utility in a retroreflective road sign comprising: (i) a polymeric layer comprising a fluorescent dye, and optionally a polyarylate, (ii) a polymeric U.V. screening layer disposed in front of said fluorescent layer and comprising polyarylate, and (iii) a plurality of retroreflective elements disposed such that incident light emanating from an automobile's headlamps is retroreflected by the road sign back to the driver of the vehicle.

Preferred polymers for the screening layer are polyarylate, and blends of polyarylate with any one or more of the following: polycarbonate, poly (cyclohexanedimethanol terephthalate) ("PCT"), poly (cyclohexamedimethanol-co-ethylene terephthalate) ("PETG"), and poly(ethylene terephthalate) ("PET"). Although the polyarylate backbone contains a moiety B capable of undergoing photo-Fries re-arrangement to a benzophenone-type U.V. light absorbing moiety, the invention is also directed to polymers which have benzophenone-type moieties (see moiety A above) in their polymeric backbone and thus do not require re-arrangement to become U.V. light absorbent.

Numerous advantages are provided by the invention. For example, it is no longer necessary to select the fluorescent colorant in a fluorescent layer for compatibility with the type of U.V. light absorbing material used in the screening layer. It is believed that the U.V. light absorbent polymer layer as used in the structure of the present invention will provide excellent protection to virtually any fluorescent colorant present in the fluorescent layer. Another advantage is the ability to substantially reduce or eliminate the use of separate U.V. light absorbing additives, thereby reducing or eliminating the known problem of such additives leaching or migrating out of the screening layer. Yet another advantage of the invention is that, in a preferred embodiment in which polyarylate is present as the U.V. light absorbent polymer in the screening layer, the polymeric screening layer also provides a combination of excellent properties important in the fabrication of durable retroreflective sheeting material such as toughness, impact resistance, and chemical resistance.

DETAILED DESCRIPTION

Figure 1:
FIG. 1 illustrates a cross-section view of a microprismatic retroreflective sheeting material of the invention comprising a U.V. light absorbent screening layer disposed over a layer having a fluorescent colorant, and wherein the retroreflective microprismatic corner cube elements are formed onto the fluorescent layer.
Figure 1:
Figure 1:
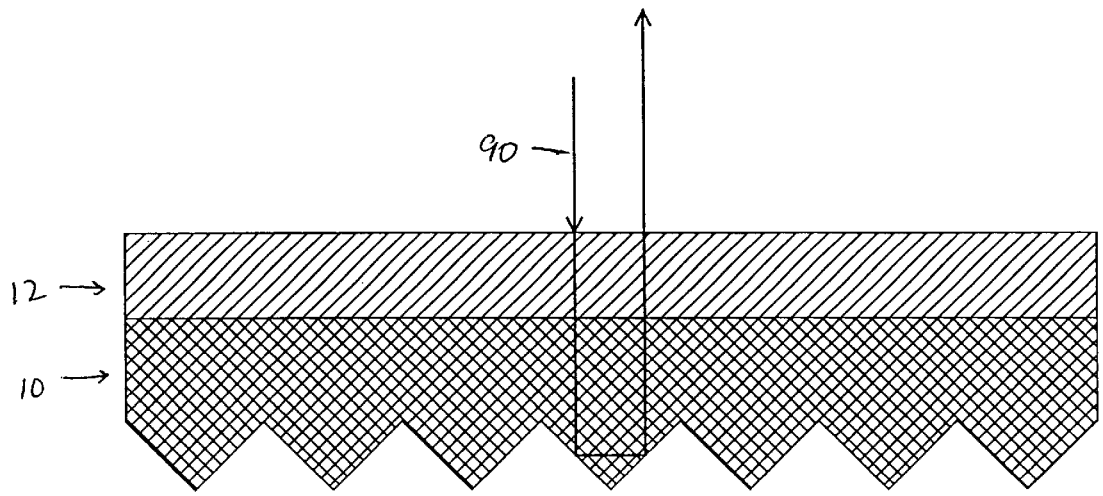

For purposes of this patent, U.V. light absorbing polymer materials are defined as polymer materials that absorb some quantity of light for at least some wavelengths between about 290–410 nm.

Generally speaking, the article of the present invention comprises at least two layers: a colored layer containing at least one fluorescent colorant, and an ultraviolet light screening layer affixed, attached or otherwise disposed in laminar configuration in front of the fluorescent layer, i.e., disposed between the fluorescent layer and the source of incident light. The two layers may be directly adhered to one another such as by coextrusion, or lamination with heat and/or adhesives. One or more intervening layers optionally may be placed between the fluorescent layer and the U.V. light screening layer.

If retroreflective properties are desired, retroreflective elements well-known in the retroreflective sheeting industry, such as microprismatic cube corner elements or glass microspheres, may be designed into the article. For example, in a simple two-layer construction of the instant invention, a plurality of microprismatic corner cube elements can be formed directly into the rear surface of the fluorescent layer, and the U.V. light absorbing layer can be utilized as the front face of the sheeting. When the retroreflective article of the invention is fabricated into a road sign, light from the headlights of an oncoming vehicle enters the multi-layered structure through the front face thereof, passes through the U.V. light screening layer to the layer containing the retroreflective elements, and is retroreflected back to the driver of the vehicle.

The heart of the invention lies in the use of a U.V. light absorbing polymer, preferably polyarylate, as a component of the polymeric matrix of the U.V. light screening layer. Optionally, the fluorescent layer may also comprise polyarylate. When exposed to light, polyarylate rearranges to a polymer having in its backbone hydroxybenzophenone moieties which absorb U.V. light. We find that the use of a U.V. light absorbing polymer having U.V. light absorbing moieties incorporated in the polymeric backbone, or moieties capable of photo-Fries rearrangement in situ to U.V. light absorbing moieties, provides much better and longer U.V. light protection than that afforded by conventional screening layers containing U.V. light absorbing additives such as hydroxybenzophenones. This is quite surprising insofar as the U.V. light absorbing moieties that form segments of the backbone of the polymers in the U.V. light screening layer of the invention (hydroxybenzophenone-type moieties, see moiety A, below) are similar to those present in conventional benzophenone U.V. light additives added to screening layers of the prior art.

In somewhat greater detail, the U.V. light screening layer of the article of the present invention can be fabricated from any polymer in which the polymeric backbone either comprises the repeating ultraviolet light absorbing hydroxybenzophenone moiety A, below:

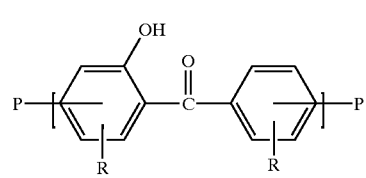

A or a repeating moiety capable of undergoing re-arrangement to the above moiety. An example of such a repeating moiety is moiety B below:

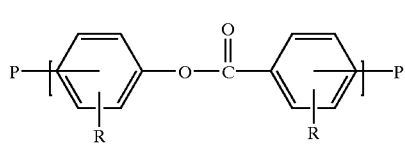

B

An example of a particularly preferred class of polymers for use in the U.V. light screening layer of the present invention containing repeating B moieties (and/or repeating A moieties following photo-Fries rearrangement) are the so-called polyarylates.

Generally speaking, polyarylates are very well known in the art and are obtained by polymerization of a diphenol and a dicarboxylic acid. Polyarylates suitable for use in the articles of the instant invention include those described in U.S. Pat. No. 4,598,130, incorporated herein by reference.

As described in U.S. Pat. No. 4,598,130, and for purposes of illustration and not by way of limitation, suitable dihydric phenols that can be employed to prepare the polyarylates are bisphenols such as bis(4-hydroxyphenyl) methane, 2,2-bis (4-hydroxyphenyl)propane (bisphenol A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, etc.; dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available such as are disclosed in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is also possible to employ two or more different dihydric phenols or a copolymer of a dihydric phenol with a glycol or with hydroxy or acid terminated polyester, or with a dibasic acid as well as blends of any of the above materials. Suitable dicarboxylic acids are the aromatic and aliphatic aromatic dicarboxylic acids such as phthalic, isophthalic, terephthalic, o-phthalic, o-, m-, and p-phenylenediacetic acid; the polynuclear aromatic acids such as diphenic acid, and 1,4-naphthalic acid.

One of the most widely used commercial polyarylates results from the polymerization of bisphenol A (2,2-bis-(4-hydroxyphenyl)propane) and a 50:50 mixture iso/terephthalic acids. This polyarylate, which is particularly preferred for use in the U.V. light screening layer of the present invention, was previously commercially available under the tradename "Ardel D100" from Amoco Performance Polymers, Inc. and is now sold by Unitika America Corporation and its distributors under the trade name "U-Polymer U-100." The preferred polyarylate used in the present invention has the following formulas I and II below. Formula I is the polyarylate prior to photo-Fries rearrangement. Formula II is the polyarylate following photo-Fries rearrangement. One or both polymers may be present in the screening layer:

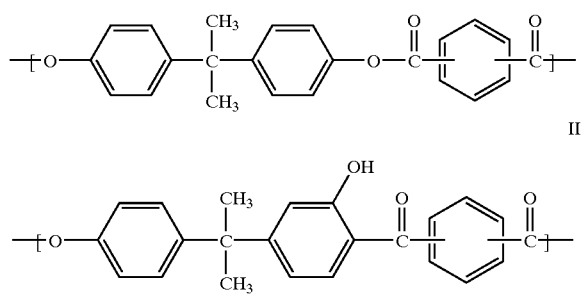

Another suitable group of polyarylates are those based on tetramethyl bisphenol-A, 4,4'-dihydroxybenzophenone, and 5-tertiary-butyl isophthalic acid dichloride, as generally disclosed in Wright, et al., *Journal of Membrane Science*, vol. 124, pp. 161–174 (1997), and other polyarylate structures disclosed therein.

A discussion of the preparation of polyarylates may be found in the chapter entitled "History of Polyarylates" by L. Robeson and J. Tibbet (at page 95 of the treatise *High Performance Polymers: Their Origin and Development*, E. B. Seymour and G. S. Kirshenbaum, editors (1986)). Known processes for the production of a polyarylate include, for example, interfacial polymerization by mixing a solution of an aromatic dicarboxylic acid dihalide in an organic solvent with an alkaline aqueous solution of a bisphenol under stirring to react these materials; solution polymerization by reacting an aromatic dicarboxylic acid dihalide with a bisphenol in the presence of a deacidifying agent such as pyridine in an organic solvent; molten polymerization by reacting an aromatic dicarboxylic acid diphenyl ester with a bisphenol; molten polymerization by reacting an aromatic dicarboxylic acid, diphenyl carbonate and a bisphenol; molten polymerization by reacting an aromatic dicarboxylic acid with a bisphenol diacetate; and polymerization by reacting an aromatic dicarboxylic acid with a bisphenol diacetate. Methods for preparation of polyarylates may be referenced in further detail in Hirose, et al. U.S. Pat. No. 5,034,502 and Berger et al. U.S. Pat. No. 4,374,239, both incorporated herein by reference.

It is well known that, upon exposure to ultraviolet light, polyarylates undergo the photo-Fries rearrangement. See Korshak et al., in "Synthesis and Properties of Self-Protecting Polyarylates", *Journal of Polymer Science*, Part A-1, Vol.7, pages 157 to 172 (1969), which describes a mechanism to explain what happens when polyarylates are exposed to U.V. light. The authors propose that polyarylates undergo the photo-Fries rearrangement resulting in carbonyl and hydroxyl groups ortho to one another, structurally similar to o-hydroxybenzophenones which are known light absorbers. The o-hydroxybenzophenone moieties which are part of the polyarylate polymer backbone can absorb more than 95% U.V. light at wavelengths below 375 nm, and substantial amounts of U.V. light between 375 and 410 nm wavelength light. We have now found that when these moieties are within the polymeric backbone of a screening layer, they function better as protectants for fluorescent colorants in another layer behind the screening layer, than when they are present as additives mixed into a screening layer polymer matrix.

It should be understood that while the above described polyarylate is a preferred U.V. light absorbing polymer for use in the screening layer of the present invention, any polymer which contains moiety A or B, above, is contemplated for use in the invention provided the polymer has properties which make it suitable for use in the particular product application under consideration. A further example of such a polymer is the block copolyestercarbonates described in International Patent Application WO 00/26275 (published May 11, 2000), incorporated by reference herein. The copolyestercarbonates described in the '275 application comprise organic carbonate blocks alternating with arylate blocks, where the arylate blocks are derived from a 1,3-dihydroxybenzene moiety and an aromatic dicarboxylic acid. Specifically the block copolyestercarbonate polymer having a moiety A and/or a moiety B as defined above has one or both of the structures (III) and (IV) below, respectively:

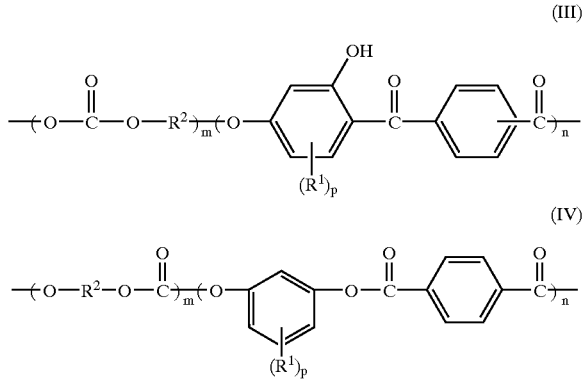

wherein each $R^1$ is independently H or $C_1$–$C_{12}$ alkyl, p is 0–3, each $R^2$ is independently a divalent organic radical; m is at least 1, and preferably about 2–200; and n is at least about 4, and preferably about 30–150.

The applicant in the above mentioned '275 application posits that the weatherability of the above copolyestercarbonates is attributable, at least in part, to the occurrence of thermally or photochemically induced photo-Fries rearrangement of arylate blocks (see structure IV above) to yield o-hydroxybenzophenone moieties (see structure III above) or analogs thereof which serve as absorbers of U.V. radiation.

Additional polymers capable of undergoing rearrangement to U.V. light absorbent polymers are described in Cohen et al. in "Transparent Ultraviolet-Barrier Coatings," *Journal of Polymer Science*, Part A-1, Vol. 9, pages 3263–3299 (1971) (incorporated by reference) which describes a number of phenyl polyesters, including polyarylates, which were synthesized to furnish molecules whose backbones rearrange under U.V. light to an o-hydroxybenzophenone structure.

The U.V. light absorbing properties of the U.V. light absorbing polymer need not result from a photo-Fries rearrangement. For example, as explained in the above-mentioned '275 application, synthesis and polymerization of suitable hydroxybenzophenone type monomers can result in polymers in which the U.V. light absorbing moiety A (see above) is already present in the polymer without need for the polymer to undergo photo-Fries rearrangement.

It should be understood that in the case where a polyarylate is used in the present invention, the U.V. light absorbing properties of the polyarylate will take some time to "develop" in the presence of U.V. radiation, with the time for "development" depending upon the environment and the intensity of the UV radiation. For example, in a Xenon Arc Weather-O-Meter, polyarylate typically takes about 50 hours to "develop". In view of this "development" period, it may be desired, although not required, to include a small quantity of U.V. light absorbing compounds or light stabilizers in or in front of the fluorescent layer to provide some initial protection in the period before the U.V. screening layer has acquired its full protective capability.

While the polymeric resin of the U.V. light screening layer may consist entirely of the U.V. light absorbing polymers described above containing a moiety A and/or B, it is also contemplated herein to use blends of the U.V. light absorbing polymer with other suitable polymers that may or may not have a U.V. light absorbing moiety in the polymeric backbone. For example, blends of polyarylate with polymers selected from the group consisting of poly(ethylene terephthalate) ("PET"); poly (cyclohexanedimethanol-co-ethylene terephthalate) ("PETG"); polycarbonate; and poly (cyclohexanedimethanol terephthalate) ("PCT") can be used. Reference may be had to Robeson et al. U.S. Pat. Nos. 4,286,075 and 4,259,458 (incorporated herein by reference) for a more detailed discussion of some of the foregoing polyarylate blends.

Methods for fabricating thermoplastic sheets from polyarylate and polyarylate blends, and for laminating these sheets to other polymeric layers are well known in the art. See for example Robeson et al. U.S. Pat. No. 4,643,937. The polymeric films which are used within this process may be fabricated in a known manner, for example using an extrusion methodology.

In somewhat greater detail, for those embodiments where the article of the instant invention is a sheeting material, the fluorescent layer as used in the present invention may be fabricated from any suitable polymer having the requisite properties for fabrication of a suitable polymeric sheeting material. Examples of particularly preferred polymers which are suitable for fabrication of the fluorescent layer are polycarbonate, polyolefins, polyarylate, poly(ethylene terephthalate) ("PET"), poly (cyclohexanedimethanol-co-ethylene terephthalate) ("PETG"), polyurethanes, polyacrylates (e.g., polymethyl methacrylate), polystyrenes, and suitable blends, alloys and copolymers (including block copolymers) of the foregoing. Methods of manufacturing the foregoing polymers, as well as fabrication of films and sheeting materials therefrom, including retroreflective sheeting materials, are exceedingly well known in the art. A particularly preferred polymer for use in the fluorescent layer of the present invention is bisphenol A polycarbonate, such as Calibre-302 commercially sold by Dow Chemical Company. Alternatively, another particularly preferred polymer for use in the fluorescent layer of the present invention is the PETG resin sold as "Eastar GN-071" by Eastman Chemical Company.

Preferably, in a retroreflective sheeting material of the instant invention, a plurality of microprismatic retroreflective elements are formed directly onto a surface of one layer of the sheeting material in a known manner. For example, Pricone et al., U.S. Pat. No. 4,601,861 discloses an improved method and apparatus for continuously embossing a repeating pattern of precise detail, in particular, cube-corner type retroreflector elements, on one surface of a single sheet or on one surface of a laminate of transparent thermoplastic materials, to form retroreflective sheeting. Pricone et al. discloses a continuous embossing tool in the form of a flexible thin metal belt or cylinder having on its outer surface an embossing pattern which is the reverse of the precision optical pattern to be formed. The embossing tool is continuously moved at a predetermined speed along a closed course through a heating station where the temperature of a portion of the embossing tool is raised above the glass transition temperature of the sheeting or laminate, and a cooling station where the heated portion of the embossing tool is cooled, while in a relatively planar condition, to below that glass transition temperature. The sheeting is continuously moved at the predetermined speed from a supply thereof into engagement with the embossing pattern on the tool and is pressed there against continuously at a plurality of pressure points sequentially spaced along the heating station, with the one surface of the sheeting confronting and engaging the embossing pattern until the sheeting is raised above its glass transition temperature and conforms to the embossing pattern on the one face. The sheeting is maintained in engagement with the tool until the tool passes through the cooling station and the sheeting is lowered below its glass transition temperature and the pattern solidifies. The sheeting thereafter is stripped from the tool. Further details of the foregoing methodology are described in Pricone et al. which is incorporated herein by reference.

It is well known that many colorants, particularly fluorescent colorants, are highly susceptible to U.V. light degradation. The present invention, insofar as it provides an excellent U.V. light screening layer, contemplates incorporation into the fluorescent layer of one or more such U.V. light sensitive colorants/dyes or a combination thereof, including known such dyes and dye combinations. The invention is not limited to any particular dye or colorant. Examples of suitable dyes are any of the fluorescent dyes which are known in the art for enhanced daytime and nighttime visibility of road signs. Example of such dyes are the perylene, perylene imide, perylene ester, thioxanthene, thioxanthone, and thioindigoid compounds. Other dyes that may be suitable include the benzoxanthene, benzothiazine, napthalimide, and coumarin based compounds. Blends of the foregoing dyes are also contemplated. As will be apparent to those skilled in the art, when the instant invention is embodied in the form of retroreflective sheeting, the dyes used will be sufficiently transparent such that the retroreflective function of the sheeting will not be significantly impaired.

Further examples of specific fluorescent dyes suitable for incorporation into the fluorescent layer of the present invention include: perylene imide and perylene ester dyes such as Lumogen F Orange 240, Lumogen F Yellow 083, and Lumogen F Red 300 (each available from BASF, Rensselaer, N.Y.); thioxanthene dyes, such as Hostasol Yellow 3G (available from Clariant Corporation, Charlotte, N.C.) and Marigold Orange D-315 (Day-Glo Color Corporation, Clevelend, Ohio.); thioxanthone dyes such as Hostasol Red GG (Clariant); thioindogoid dyes such as Hostasol Red 5B (Clariant); coumarin based dyes such as Macrolex 10GN (available from Bayer Corporation) and Potomac Yellow D-838 (Day-Glo); benzoxanthene dyes such as Lumofast Yellow 3G (Day-Glo); and benzothiazine dyes such as Huron Yellow D-417 (Day-Glo).

Examples of particularly preferred dyes for use in the fluorescent layer are: thioxanthene dyes such as "Hostasol Yellow 3G" Solvent Yellow 98 dye available from Clariant; the perylene ester and perylene imide dyes, such as "Lumogen F Yellow 083" or "Lumogen F Orange 240" available from BASF; benzoxanthene dyes, such as "Lumofast Yellow 3G" available from Day-Glo Color; and benzothiazine dyes, such as "Huron Yellow D-417" available from Day-Glo Color.

In addition to the fluorescent dyes, non-fluorescent colorants may also be used to adjust the color of the final product.

The amount of fluorescent dye used in the fluorescent layer is dependent upon the type of dye, typically in the range of about 0.05 to about 1.5 percent, preferably in the range of 0.08 to 1.0 percent based on the total weight of the fluorescent layer. In some cases, the loading of fluorescent dyes depends on the gauge of the fluorescent layer and the specific tint desired. The loading level can easily be determined in accordance with the skill in the art.

To further enhance the fluorescent durability of the system, the fluorescent layer may optionally contain many of the well known ultraviolet light absorbers (UVA's) and hindered amine light stabilizers (HALS), although the present invention makes it possible to substantially reduce or eliminate such additives in the fluorescent layer and in the U.V. light screening layer. Examples of suitable U.V. light absorbers include the benzophenones, benzotriazoles, and oxalanilides. Examples of commercially available benzophenones include: 2-hydroxy-4-n-octoxybenzophenone commercially available from Great Lakes Chemical Corporation under the trade name "Lowilite 22"; 2,2-dihydroxy-4,4-dimethoxybenzophenone available under the trade name "Uvinul 3049" from BASF; and 2,2',4,4'-tetrahydroxybenzophenone available under the trade name "Uvinul 3050" from BASF. Examples of suitable benzotriazoles include 2-(2H-benzotriazol-2-yl)-4,6-bis(1-methyl-1-phenylethyl)phenol sold under the trade name "Tinuvin 234" by Ciba-Geigy; and 2-(4,6-diphenyl-1,3,5-triazine-2-yl)-5(hexyl)oxyphenol sold commercially by Ciba-Geigy as "Tinuvin 1577". An example of an oxalanilide U.V. absorber is 2-ethyl,2'-ethoxy-oxalanilide sold under the trade name "Sanduvor VSU" by Clariant. Individuals skilled in the art will recognize that many other suitable benzophenone, benzotriazole, and oxalanilide U.V. light absorbers exist and may be suitable for use in the present invention.

The amount of U.V. light absorber suitable for use in the fluorescent layer of the invention is in the range of about 0.2 to about 4 percent, and preferably in the range of about 0.3 to about 2.0 percent based on the total weight of the fluorescent layer.

We also believe it may be advantageous to use oligomeric and/or polymeric HALS in the present invention either alone or in conjunction with U.V. light absorbers. Examples of suitable HALS include certain products available from Ciba Specialty Additives, and described by Ciba Specialty Additives as dimethyl succinate polymer with 4-hydroxy-2,2,6,6-tetramethyl-1-piperidineethanol commercially available from Ciba Specialty Additives as "Tinuvin 622"; poly[[6-[(1,1,3,3,-tetramethyl butyl) amino]-s-triazine-2,4-diyl][(2,2,6,6,-tetramethyl-4-piperidyl) imino] hexamethylene [(2,2,6,6-tetramethyl-4-piperidyl) imino]] commercially available from Ciba Specialty Additives under the trade name Chimassorb 944; "Tinuvin 791" which is available from Ciba Specialty Additives and is a blend of poly[[6-[1,1,3,3,-tetramethylbutyl) amino]-s-triazine-2,4-diyl][[(2,2,6,6,-tetramethyl-4-piperidyl) imino] hexamethylene [(2,2,6,6-tetramethyl-4-piperidyl) imino]] and bis(2,2,6,6-tetramethyl-4-piperidynyl) sebacate. Another suitable HALS is "Hostavin N30" available from Clariant. Those skilled in the art will recognize that many other hindered amine light stabilizers may be used in the present invention.

The amount of HALS suitable for use in the fluorescent layer of the invention is in the range of about 0.2 to about 2 percent, and preferably in the range of about 0.3 to about 1.0 percent based on the total weight of the fluorescent layer formulation.

Depending upon the polymer type, the fluorescent layer may be fabricated by any of the well known film manufacturing methods such as extrusion, calendaring, or casting. The U.V. light absorbing layer typically will be extruded, although other film forming techniques can be used. For some types of extrusion operations, it may be possible to co-extrude the U.V. light absorbing screening layer and the fluorescent layer, in accordance with known co-extrusion techniques.

Figure 5:
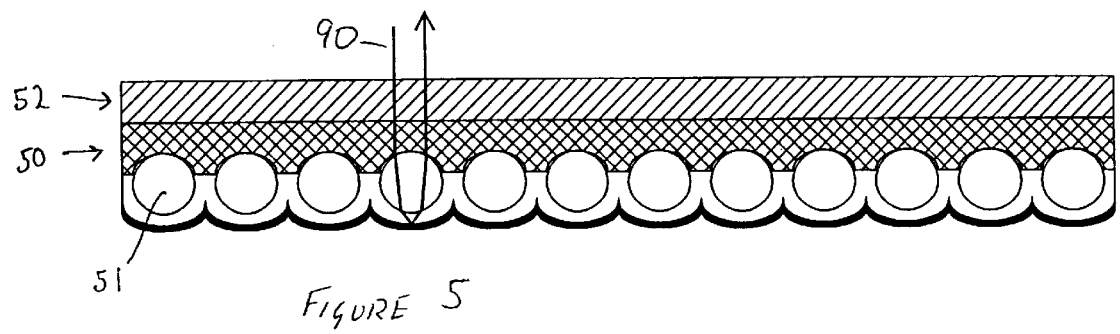
FIG. 5 illustrates a cross-section view of an enclosed lens retroreflective sheeting material of the invention where the U.V. light absorbing screening layer and a layer comprising a fluorescent colorant are disposed over an enclosed lens structure.
Figure 6:
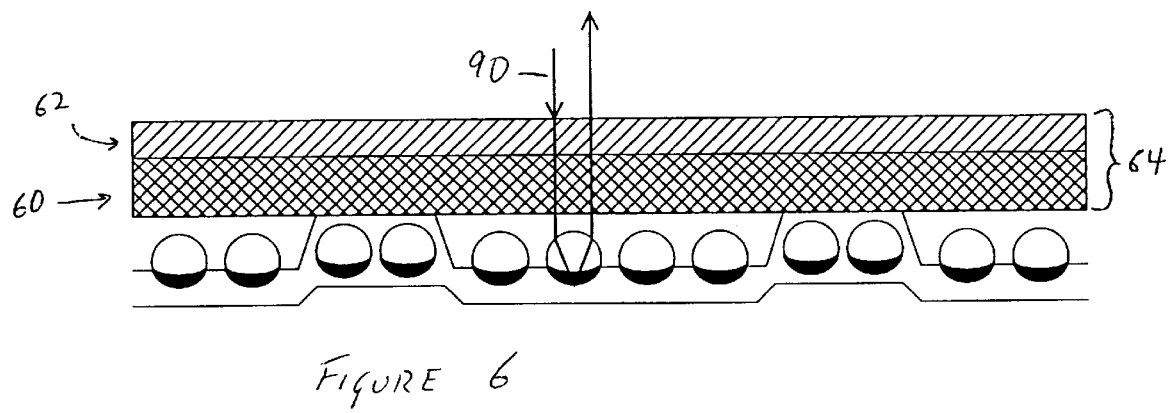
FIG. 6 illustrates a cross-section view of an encapsulated lens retroreflective sheeting material of the invention where the U.V. light absorbing screening layer and a layer comprising a fluorescent colorant are disposed over an encapsulated lens structure.

The U.V. light absorbent screening layer of the instant invention can be used in several different embodiments. FIGS. 1–6 illustrate different embodiments of retroreflective sheeting, in which the U.V. light absorbing layer is made in accordance with the instant invention, and in which the retroreflective elements are either microprismatic corner cubes (FIGS. 1–4) or glass microspheres (FIGS. 5–6). In each Figure, the arrow 90 indicates the path of a ray of incident light as it penetrates the structure, is retroreflected by a retroreflective element, and is returned out through the front face of the structure.

FIG. 1 illustrates the simplest embodiment of a retroreflective sheeting article made in accordance with the instant invention, which is a two-layer structure having a fluorescent layer 10 with microprismatic retroreflective elements on one surface thereof and a U.V. light screening layer 12 of the instant invention disposed adjacent the opposite surface thereof.

Figure 2:
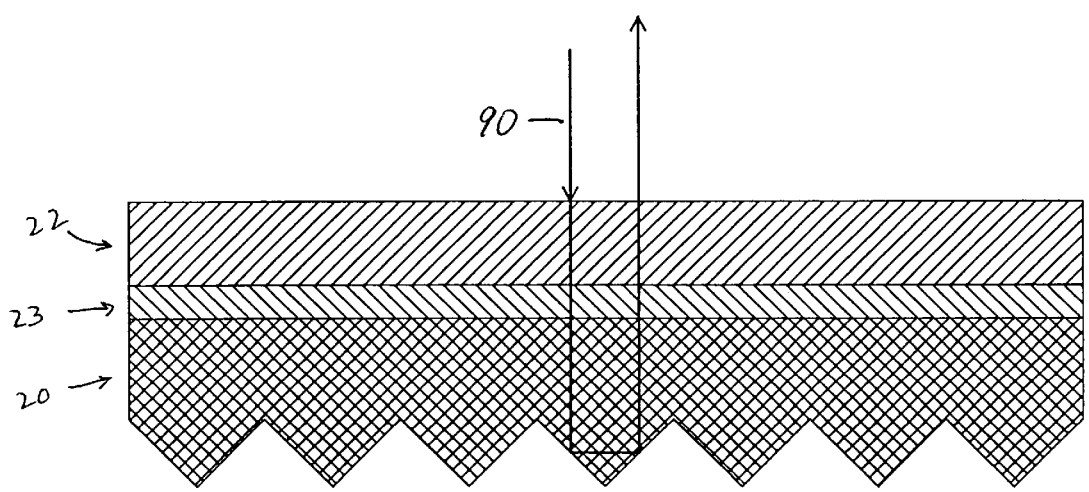
FIG. 2 illustrates a cross-section view of a microprismatic retroreflective sheeting material of the invention comprising a U.V. light absorbent screening layer disposed over a layer having a fluorescent colorant, and a tie layer or adhesive therebetween, and wherein the retroreflective microprismatic corner cube elements are formed onto the fluorescent layer.

FIG. 2 illustrates an alternative embodiment of a retroreflective sheeting article made in accordance with the instant invention having a fluorescent layer 20 with microprismatic retroreflective elements on one surface thereof, a U.V. light screening layer 22 of the instant invention disposed over said fluorescent layer 20 in laminar configuration, and a tie layer 23 disposed between layers 20 and 22. The use of tie layers is well known in the art of laminate sheeting material, and is used primarily to improve the interfacial adhesion between layers of the laminate. A brief discussion of how tie layers can be utilized in retroreflective sheeting can be found, for example, in U.S. Pat. No. 5,450,235. In a slightly different embodiment of the present invention, layer 23 may also represent a laminating adhesive between layers 20 and 22.

Figure 3:
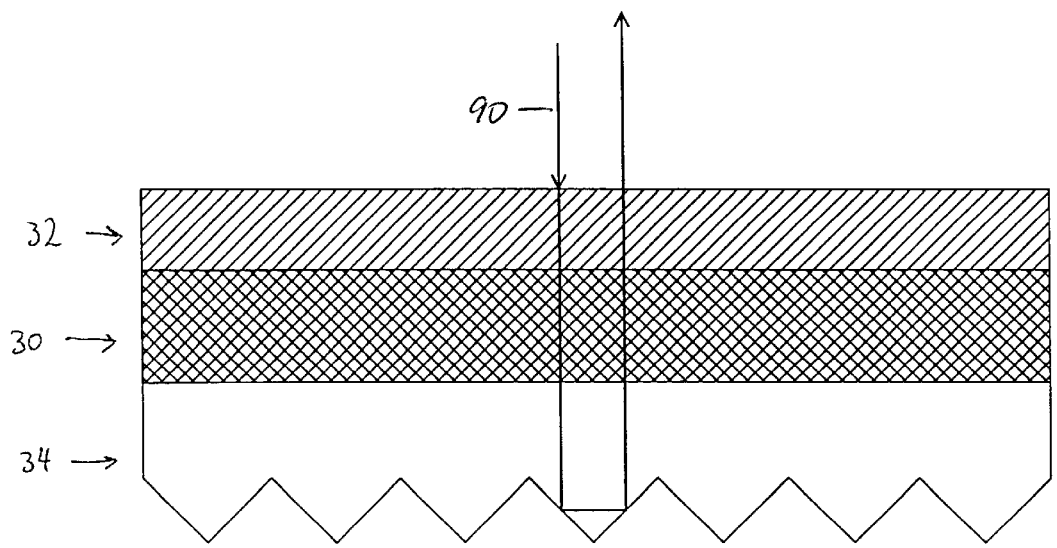
FIG. 3 illustrates a cross-section view of a microprismatic retroreflective sheeting material of the invention comprising a U.V. light absorbent screening layer, a layer comprising a fluorescent colorant, and a colorless retroreflective layer, and wherein the retroreflective elements are microprismatic corner cubes, formed on the colorless layer.

FIG. 3 illustrates yet another alternative embodiment of a microprismatic retroreflective sheeting article made in accordance with the instant invention comprising a fluorescent layer 30, a U.V. light screening layer 32 of the instant invention disposed over one surface of said fluorescent layer 30 in laminar configuration, and a retroreflective layer 34 having a plurality of microprismatic retroreflective elements, said layer 34 being disposed in laminar configuration against the surface of fluorescent layer 30 opposite U.V. light screening layer 32. Such a construction may be desirable when a specific material may be preferred for use in the retroreflective layer, such as for its optical properties or its cube geometry retention properties, but which material may not be the most suitable host for a fluorescent colorant. The structure of FIG. 3 allows the sheeting designer to choose materials for each of the layers that will optimize the properties of the entire finished sheeting structure.

Figure 4:
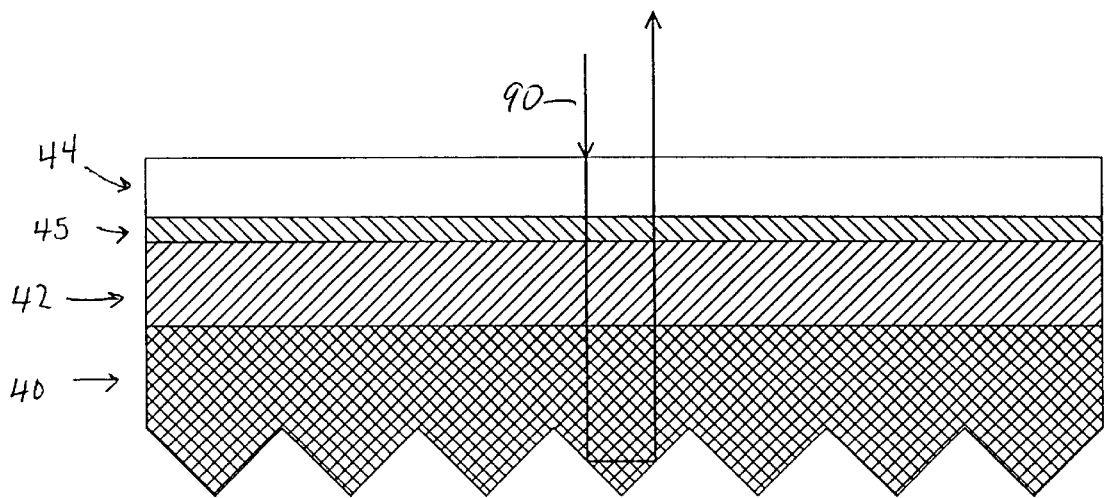
FIG. 4 illustrates a cross-section view of a microprismatic retroreflective sheeting material of the invention comprising a U.V. light absorbent screening layer, a layer comprising a fluorescent colorant, and a colorless layer, the colorless layer being disposed over the U.V. light absorbent screening layer, and wherein the retroreflective elements are formed on the fluorescent layer.

FIG. 4 illustrates an alternative embodiment of a microprismatic retroreflective sheeting article made in accordance with the instant invention comprising a fluorescent layer 40 comprising a plurality of microprismatic retroreflective elements, a U.V. light screening layer 42 of the instant invention disposed in laminar configuration over the surface of fluorescent layer 40 opposite the retroreflective elements, and a cap layer or overlaminate film 44 disposed in laminar configuration over the front surface of U.V. light screening layer 42. Cap layer or overlaminate film 44 may be selected to have properties desirable for the front surface of a sign, such as dew resistance or ease of printing, which properties may not be optimum in the U.V. light screening layer. Optional layer 45 can either be a tie layer or an overlaminate adhesive such as are known in the art. It will be understood that such an optional tie layer or overlaminate adhesive also could be disposed between layers 40 and 42.

FIG. 5 illustrates how the present invention can be incorporated into an enclosed lens retroreflective sheeting article. Enclosed retroreflective sheeting is well-known in the art, having been taught as early as U.S. Pat. No. 2,407,680 (Palmquist) and comprising lenses such as glass microspheres embedded in a sheeting structure with a flat, transparent cover film. In the embodiment in FIG. 5, glass microspheres 51 are embedded in flat transparent cover film 54 comprising a fluorescent layer 50 and U.V. light absorbing layer 52 of the present invention disposed thereover layer 50. Specularly reflective layer 55 may be deposited aluminum, as is well known in the art.

FIG. 6 illustrates how the present invention can be incorporated into an encapsulated lens retroreflective article. Encapsulated lens sheeting is also well known in the art, having been taught as early as U.S. Pat. No. 3,190,178 (McKenzie). Such sheeting comprises a binder layer in which a monolayer of lenses such as glass microspheres is partially embedded, and further comprises a cover film sealed to the binder layer such that the lenses are encapsulated within hermetically sealed cells. In the embodiment illustrated in FIGS. 6, glass microspheres 61 are partially embedded in binder layer 66, and cover film 64 comprises two layers, namely, the U.V. light absorbing layer 62 of the present invention disposed over a fluorescent layer 60. The two layers 60 and 62 together create cover layer 64 of the encapsulated glass bead retroreflective structure.

The embodiment of FIGS. 1–6 are by way of illustration and not by way of limitation. For example, the tie layer 23 of FIG. 2 could also be used between any of the layers in the embodiments of FIGS. 3–6. The cap layer 44 of FIG. 4 could find utility in the structures of FIGS. 1–3, 5, and 6.

In another embodiment of the invention, one surface of one of the layers can be pre-printed with a desired legend, such that the finished laminar structure has the desired legend on an inner surface thereof, such as disclosed in U.S. Pat. No. 5,213,872 and U.S. Pat. No. 5,310,436, both incorporated herein by reference in their entirety. For example, a layer having a legend pre-printed thereon may be disposed between layers 10 and 12 of the embodiment of FIG. 1, or a legend may be pre-printed on the top surface of layer 42 or the bottom surface of layer 44 of the embodiment of FIG. 4.

Other variations will be apparent to those skilled in the art of retroreflective sheeting.

The following examples are provided for purposes of illustration, only, and are not intended to limit the scope of the invention as defined in the appended claims.

EXAMPLES

The U.V. light screening layer used in each of the following examples is extruded two mil polyarylate film. It should be understood, however, that the U.V. light screening layer can be any transparent film containing polyarylate or a polymer with similar molecular structure to polyarylate, and blends thereof, such as polyarylate/polycarbonate blends, polyarylate/PET blends, polyarylate/PETG blends, as well as polymers (and blends thereof) which contain the U.V. light absorbing moieties A and/or B defined above. The fluorescent film formulations in each of the examples were made using C. W. Brabender Plasti-Corder Prep-Mixer (manufactured by C. W. Brabender Instruments, Inc. of Hackensack, N.J.) through melt mixing of polymer resins and additives, followed by conversion into films of approximately 4–6 mils using a heated Carver press. The mixing temperatures used were in the range of about 230–300° C. depending on the resins. The Brabender speed was 100 rpm and the mixing time used was in the range of about 3 to 6 minutes. The U.V. light screening layer films were directly laminated to one side of the fluorescent layer films using heat lamination.

After preparing the samples, each was placed into a Xenon Arc accelerated weathering unit and color measurements were routinely measured. The test methodology used for the Xenon Arc weathering is outlined in ASTM G26–90, Section 1.3.1. Borosilicate inner and outer filters were used, and the irradiance level was set to 0.35 W/m² at 340 nm. Color measurements were taken on a Hunter Lab LS6000 instrument using a D65 light source, 2° observer, and a 0/45 geometric configuration. To determine the extent of fading and color shifts, the CIE E* color difference factor was calculated to compare color measurements after accelerated weathering exposure with initial measurements made prior to weathering. A small value for the CIE E* color difference factor indicates small differences in color. A value of about 2 or 3 is barely detectable to the human eye.

Example 1

This example demonstrates the ability of a polyarylate screening layer to protect the fluorescence and color durability of a fluorescent polycarbonate layer with or without U.V. light protecting additives and the fluorescent dyes. The polycarbonate resin pellets used were Calibre-302 available from Dow Chemical Company, blended with 0.25 wt % HALS (Tinuvin 622 from Ciba). In samples 1.2a, 1.2b, and 1.4a, 1.4b, the polycarbonate layer also included 0.3 wt % Tinuvin 234 (Ciba) U.V. light absorber. The fluorescent dyes used were Huron Yellow D-417 and Lumofast Yellow 3G (LF-3G), both available from Day-Glo Color Corporation, Cleveland, Ohio. In these samples, the loading of D-417 and LF-3G in the polycarbate layer was 0.08 and 0.8 wt%, respectively. The polyarylate film used in the screening layer was purchased as extruded film sold under the trademark "Ardel" by Westlake Plastics Company, Lenni, Pa. The accelerated weathering results are shown in Table 1 below.

TABLE I

Accelerated Weathering Results of Fluorescent Polycarbonate* Layer Protected with Polyarylate ("PAL") Screening Layer

| Sample | Fluorescent Dye | UVA in Polycarbonate | PAL Screen | ΔE* of Samples Exposed at Indicated Period of Time (Hours) | | |
|---|---|---|---|---|---|---|
| | | | | 500 | 1000 | 1500 |
| 1.1a | D-417 | No | No | 8.62 | 13.21 | 17.40 |
| 1.1b | D-417 | No | Yes | 1.70 | 1.65 | 1.51 |
| 1.2a | D-417 | Yes | No | 5.82 | 14.84 | 6.76 |
| 1.2b | D-417 | Yes | Yes | 1.49 | 1.23 | 0.94 |
| 1.3a | LF-3G | No | No | 8.32 | 13.38 | 16.92 |
| 1.3b | LF-3G | No | Yes | 9.29 | 7.36 | 6.42 |
| 1.4a | LF-3G | Yes | No | 14.94 | 17.12 | 17.73 |
| 1.4b | LF-3G | Yes | Yes | 12.42 | 12.29 | 11.56 |

*Polycarbonate blended with 0.25 wt % HALS.

The results in Table I illustrate that in each sample pair, the sample having the polyarylate screening layer had a significantly smaller value of E*, indicating greater fluorescence and color durability. Further, for dye D-417, sample 1.1b with a polyarylate screen layer and no U.V. light absorbing additive in the polycarbonate had lower ΔE than sample 1.2a having no polyarylate screen layer and having U.V. light absorbing additive in the polycarbonate. Similarly, for dye Lumofast Yellow 3G, sample 1.3b having a polyarylate screen layer and no U.V. light absorbing additive in the polycarbonate had lower ΔE* than sample 1.4a, having a U.V. light absorbing additive in the polycarbonate and no polyarylate screen layer. It is also surprising that, for Lumofast Yellow 3G, sample 1.3b having a polyarylate screen layer and no U.V. light absorbing additive outperformed sample 1.4b having both a polyarylate screen layer and a U.V. absorbing additive in the polycarbonate layer. It should be pointed out that Lumofast Yellow 3G has an initial color shift in the first 40 hours of accelerating weathering of about 10 ΔE* units. The photo-Fries rearrangements of polyarylate take about 50 hours to reach their full function as a screen layer under accelerated weathering. We believe that this is the reason that the polyarylate screen layer did not prevent the initial ΔE* shift of Lumofast Yellow 3G. After this initial shift, the PAL screen layer served to prevent further fading of Lumofast Yellow 3G in polycarbonate.

Example 2

This Example demonstrates the ability of a polyarylate screening layer to impart improved durability of fluorescent properties to a fluorescent layer fabricated from PETG and containing any of the dyes "Hostasol Yellow 3G" (HY-3G) from Clariant, "Lumogen Yellow 083" (LY-083) from BASF, and "Lumofast Yellow 3G" (LF-3G) from Day-Glo. The PETG resin utilized was "Eastar GN-071" available from Eastman Chemical, Kingsport, Tenn. In samples 2.1a, 2.1b the fluorescent layer was a blend of PETG with 0.45 wt % Hostasol Yellow 3G. In samples 2.2a, 2.2b the fluorescent layer was a blend of PETG with 0.8 wt % Lumofast Yellow 3G. In samples 2.3a, 2.3b the fluorescent layer was a blend of PETG with 0.25 wt % Lumogen Yellow 083. No light stabilizers or ultraviolet light absorbing additives were incorporated into the PETG/fluorescent layer. The weathering results are shown in Table 2.

TABLE 2

Accelerated Weathering Results of Fluorescent PETG Layer Protected with Polyarylate ("PAL") Screening Layer

| Sample | Dyes | PAL Screen | ΔE* of Samples Exposed at Indicated Period of Time (Hours) | | |
|---|---|---|---|---|---|
| | | | 500 | 1000 | 1500 |
| 2.1a | HY-3G | No | 4.60 | 10.03 | 11.10 |
| 2.1b | HY-3G | Yes | 6.63 | 6.22 | 6.38 |
| 2.2a | LF-3G | No | 11.89 | 11.34 | 10.83 |
| 2.2b | LF-3G | Yes | 7.30 | 6.90 | 7.40 |
| 2.3a | LY-083 | No | 1.78 | 8.42 | 7.48 |
| 2.3b | LY-083 | Yes | 2.87 | 3.26 | 3.76 |

Example 3

This example demonstrates the ability of a polyarylate screening layer to impart improved durability of fluorescent properties to a fluorescent layer fabricated from fluorescent polyarylate. The fluorescent layer was fabricated from polyarylate available from Unitika America Corporation, New York, N.Y. as "U-Polymer U-100" blended with 0.25 wt % Hostasol Yellow 3G. The results are shown in Table 3.

TABLE 3

Accelerated Weathering Results of Fluorescent Polyarylate ("PAL") Layer Protected with Polyarylate ("PAL") Screening layer

| Sample | Dyes | PAL Screen | ΔE* of Samples Exposed at Indicated Period of Time (Hours) | | |
|---|---|---|---|---|---|
| | | | 500 | 1000 | 1500 |
| 3-1 | HY-3G | No | 6.19 | 9.98 | 13.96 |
| 3-2 | HY-3G | Yes | 2.04 | 1.13 | 5.36 |

This example shows that, while a polyarylate matrix provides some protection for Hostasol Yellow 3G fluorescent dye, even better protection is provided by a polyarylate screen layer over the dye-containing polyarylate matrix.

Example 4

This example demonstrates that a polyarylate screen layer enhances the durability of fluorescent properties of Hostasol Yellow 3G in polyarylate/polycarbonate (PAL/PC) blend both with and without U.V. light absorbers (Tinuvin 1577) and HALS (Tinuvin 622) in the PAL/PC blend. The PAL/PC blend is available from Unitika as "U-Polymer P-5001". The content of the dye is in each sample was 0.25 wt % based on total weight of the blended resin formulation of the fluorescent layer. The results are shown in Table 4.

TABLE 4

Accelerated Weathering Results of Fluorescent Polyarylate/Polycarbonate Layer Protected with Polyarylate ("PAL") Screening Layer

| Sample | Additives | Pal Screen | $\Delta E^*$ of Samples Exposed at Indicated Period of Time (Hours) | | |
|---|---|---|---|---|---|
| | | | 500 | 1000 | 1500 |
| 4.1a | No | No | 4.14 | 3.79 | 5.78 |
| 4.1b | No | Yes | 2.68 | 2.78 | 2.06 |
| 4.2a | 0.3% UVA | No | 1.65 | 2.18 | 2.94 |
| 4.2b | 0.3% UVA | Yes | 2.21 | 2.26 | 1.65 |
| 4.3a | 0.3% UVA 0.3% HALS | No | 2.38 | 2.44 | 3.75 |
| 4.3b | 0.3% UVA, 0.3% HALS | Yes | 3.41 | 3.55 | 3.13 |

The results in Table 4 above show that the durability of fluorescence and color is increased by a polyarylate screening layer, both with and without the use of U.V. light absorbers and light stabilizers. Basically, no change in $\Delta E^*$ occurs in the samples having the polyarylate screening layer during the indicated period of time after the initial color shift ($\Delta E^* \approx 2$–4).

Example 5

This example illustrates the effectiveness of a polyarylate screen layer in protecting the fluorescent properties of Hostasol Yellow 3G in a polyarylate/poly(ethylene terephthalate) (PAL/PET) blend both with and without U.V. absorbers (Tinuvin 1577) and HALS (Tinuvin 622). The PAL/PET blend is available from Unitika as U-Polymer U-8400H. The content of the dye is 0.25 wt % based on total weight of the fluorescent layer for all samples. The weathering results are shown in Table 5.

TABLE 5

Accelerated Weathering Results of Fluorescent Polyarylate/PET Layer Protected with Polyarylate ("PAL") Screening Layer

| Sample | Additives | PAL Screen | $\Delta E^*$ of Samples Exposed at Indicated Period of Time (Hours) | | |
|---|---|---|---|---|---|
| | | | 500 | 1000 | 1500 |
| 5.1a | No | No | 2.98 | 4.46 | 7.47 |
| 5.1b | No | Yes | 4.42 | 3.98 | 3.50 |
| 5.2a | 0.3% UVA | No | 3.49 | 7.86 | 3.66 |
| 5.2b | 0.3% UVA | Yes | 3.65 | 3.51 | 3.39 |
| 5.3a | 0.3% UVA, 0.3% HALS | No | 1.87 | 5.47 | 6.19 |

TABLE 5-continued

Accelerated Weathering Results of Fluorescent Polyarylate/PET Layer Protected with Polyarylate ("PAL") Screening Layer

| Sample | Additives | PAL Screen | $\Delta E^*$ of Samples Exposed at Indicated Period of Time (Hours) | | |
|---|---|---|---|---|---|
| | | | 500 | 1000 | 1500 |
| 5.3b | 0.3% UVA, 0.3% HALS | Yes | 3.09 | 2.15 | 2.49 |

The results in Table 5 illustrate that a polyarylate screen layer provides superior protection for Hostasol Yellow 3G in a layer fabricated from a PAL/PET blend, both with and without the use of U.V. light absorbers. Again, basically no change in $\Delta E^*$ occurs in the samples having the polyarylate screening layer during the indicated period of time after the initial color shift ($\Delta E^* \approx 2$–4).

While the article of the instant invention has been described in terms of a multi-layer retroreflective sheeting material, the invention is not so limited. The instant invention is intended to encompass any fluorescent article that can benefit from an ultraviolet screening layer of the claimed composition. Other fluorescent articles intended for long term outdoor use and provided with such a U.V. screening layer are also intended to be within the scope of the invention. The invention also is not limited to the particular materials disclosed herein. Those skilled in the art will recognize that there are many polyarylate materials other than the specific materials disclosed herein that may be suitable for use in the instant invention. Some such materials may have backbone moiety structures which differ slightly from the backbone moiety structures disclosed herein. For purposes of the instant invention, what is important is that the polymer material comprise a polymer which either is, or is capable of undergoing rearrangement into, a U.V. light absorbing polymer material. Further, while the polymeric resins discussed herein for both the fluorescent layer and the screening layer have been thermoplastic resins, certain thermoset resins may also find utility in structures embodying the U.V. screening layer of the instant invention. Similarly, other thermoplastic resins, fluorescent dyes, U.V. absorbers, and HALS compounds can also be used.

We claim:
1. An article comprising;
   (a) a fluorescent polymeric layer comprising a fluorescent dye; and
   (b) an ultraviolet light screening layer comprising a polymeric resin, said polymeric resin comprising at least one polymer, or a mixture thereof, selected from the group consisting of:
      (i) polymers having a polymeric backbone comprising the following repeating moiety A;

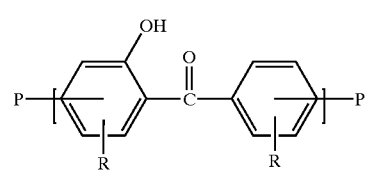

A wherein R is a non-interfering substitutent and P is the remainder of the polymer; and whereby the polymers are able to absorb ultraviolet light; and
      (ii) polymers having a polymeric backbone comprising the following repeating moiety B:

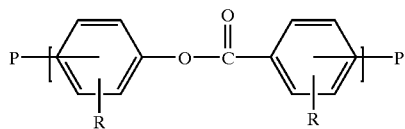

wherein R is a non-interfering substituent and P is the remainder of the polymer; said moiety B being transformable to said moiety A by photo-Fries rearrangement, whereby said polymer comprising moiety B can be transformed to an ultraviolet light absorbing polymer comprising moiety A.

2. The article of claim 1 wherein the ultraviolet light screening layer comprises a polyarylate resin.

3. The article of claim 2 wherein the polyarylate resin comprises at least one polymer selected from the group consisting of polyarylate polymers comprising one or both of the following repeating structures I and II:

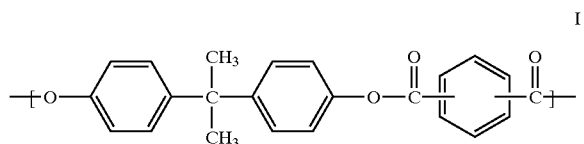

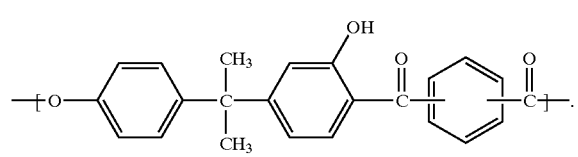

4. The article of claim 1 wherein the polymeric resin of the U.V. screening layer comprises a blend of polyarylate and at least one additional polymer.

5. The article of claim 4 wherein said additional polymer is selected from the group consisting of polycarbonate, poly(cyclohexanedimethanol terephthalate), poly(cyclohexanedimethenol-co-ethylene terephthalate), poly(ethylene terephthalate), and blends thereof.

6. The article of claim 4 wherein said additional polymer in the ultraviolet light screening layer comprises polycarbonate.

7. The article of claim 1 wherein said at least one polymer in the ultraviolet light screening layer is a block copolyestercarbonate having arylate blocks and carbonate blocks.

8. The article of claim 7 wherein the block copolymer has a polymeric backbone comprising one or both of the following repeating structures:

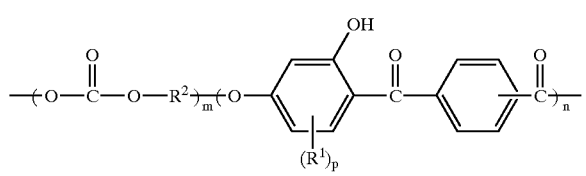

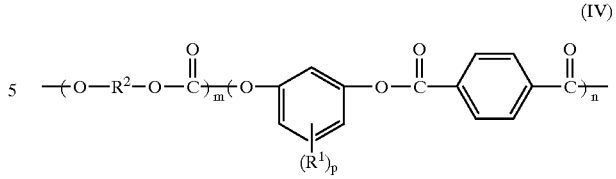

wherein each $R^1$ is independently H or $C_1$–$C_{12}$ alkyl, p is 0–3, each $R^2$ is independently a divalent organic radical; m is about 2–200; and n is about 30–150.

9. The article of claim 1 in the form of a retroreflective sheeting material.

10. The article of claim 1 wherein the fluorescent layer further comprises a non-fluorescent colorant.

11. The article of claim 1 wherein the fluorescent dye is selected from the group consisting of perylene dyes, perylene ester dyes, perylene imide dyes, thioxanthone dyes, thioindigoid dyes, thioxanthene dyes, benzoxanthene dyes, benzothiazine dyes, naphthalimide dyes, coumarin dyes, and mixtures thereof.

12. The article of claim 11 wherein the fluorescent dye comprises a thioxanthene dye.

13. The article of claim 12 wherein the thioxanthene dye comprises Solvent Yellow 98.

14. The article of claim 11 wherein the fluorescent dye comprises a perylene imide or perylene ester dye.

15. The article of claim 14 wherein the fluorescent dye comprises any one or more of Lumogen F Yellow 083, Lumogen F Orange 240, and Lumogen F Red 300.

16. The article of claim 11 wherein the fluorescent dye comprises a benzoxanthene dye.

17. The article of claim 11 wherein the fluorescent dye comprises a benzothiazine dye.

18. The article of claim 1 wherein the fluorescent layer comprises a polymeric resin selected from the group consisting of polycarbonate, poly(ethylene terephthalate), poly(cyclohexanedimethanol-co-ethylene terephthalate), poly(cyclohexanedimethanol terephthalate), polyarylate, copolyestercarbonate block copolymers containing arylate and carbonate blocks, polyurethanes, polystyrenes, acrylic polymers, polyvinyl chloride, and blends thereof.

19. The article of claim 18 wherein the fluorescent layer comprises polyarylate.

20. The article of claim 19 wherein the polyarylate has a polymeric backbone comprising one or both of the following repeating structures:

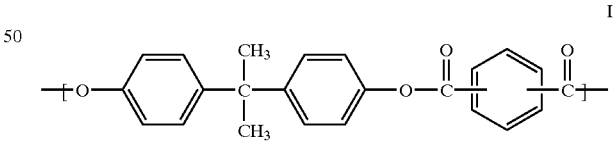

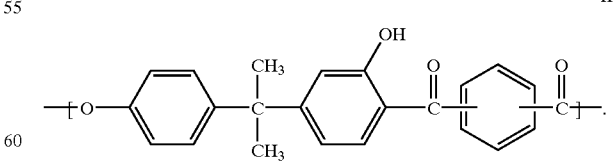

21. The article of claim 1 in the form of a fluorescent retroreflective sheeting material comprising:
a fluorescent layer comprising said polymeric matrix comprising a polyarylate and a fluorescent dye admixed therein; and a plurality of retroreflective elements.

22. The article of claim 18 wherein the fluorescent layer comprises a polymeric resin selected from the group consisting of poly(ethylene terephthalate), poly (cyclohexanedimethanol-co-ethylene terephthalate), and mixtures thereof.

23. The article of claim 19 wherein the fluorescent layer comprises a blend of polyarylate and at least one additional resin selected from the group consisting of polycarbonate, poly(ethylene terephthalate), poly(cyclohexanedimethanol terephthalate), and poly (cyclohexanedimethanol-co-ethylene terephthalate).

24. The article of claim 23 wherein the fluorescent layer comprises a blend of polyarylate and polycarbonate.

25. The article of claim 23 wherein the fluorescent layer comprises a blend of polyarylate and poly(ethylene terephthalate).

26. The article of claim 1 wherein the fluorescent layer comprises one or more additives selected from the group consisting of U.V. absorbing additives and hindered amine light stabilizing additives, wherein said one or more additives is present as an admixture with the polymeric resin in said layer.

27. The article of claim 1 further comprising a plurality of retroreflective elements selected from the group consisting of microprismatic cube corners and glass microspheres.

28. The article of claim 27 wherein said retroreflective elements are microprismatic cube corners.

29. The article of claim 28 wherein said cube corners are formed on a surface of said fluorescent layer.

30. The article of claim 28 comprising a third polymeric layer, said fluorescent layer being disposed between said screening layer and said third polymeric layer, said cube corners being disposed on the surface of said third polymeric layer opposite said fluorescent layer.

31. The article of claim 30 comprising a fourth layer disposed in laminar configuration over said screening layer.

32. The article of claim 27 wherein the retroreflective elements are microspheres in an enclosed lens configuration.

33. The article of claim 32 wherein said at least one polymer is a polyarylate.

34. A retroreflective sheeting material comprising:
(a) a fluorescent polymeric layer comprising a fluorescent dye; and
(b) an ultraviolet light screening layer comprising a polymeric resin, said polymeric resin comprising at least one polymer, or mixture thereof, selected from the group consisting of:
(i) polymers having a polymeric backbone comprising the following repeating moiety A;

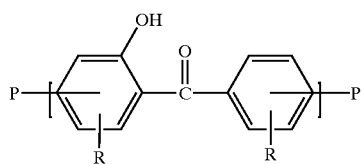

wherein R is a non-interfering substitutent and P is the remainder of the polymer; and whereby the polymers are able to absorb ultraviolet light; and
(ii) polymers having a polymeric backbone comprising the following repeating moiety B:

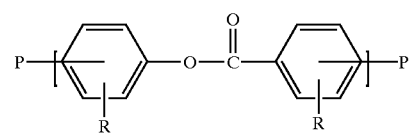

wherein R is a non-interfering substituent and P is the remainder of the polymer; said moiety B being transformable to said moiety A by photo-Fries rearrangement in the presence of ultraviolet light, whereby said polymer comprising moiety B can be transformed to an ultraviolet light absorbing polymer comprising moiety A.

35. The retroreflective sheeting material of claim 34 wherein said at least one polymer in the ultraviolet screening layer comprises a polyarylate having a polymeric backbone comprising one or both of the following repeating units (I) and (II):

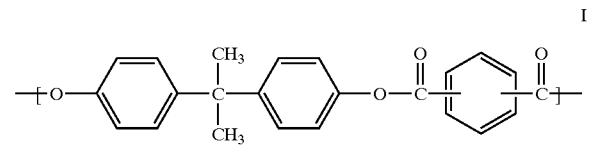

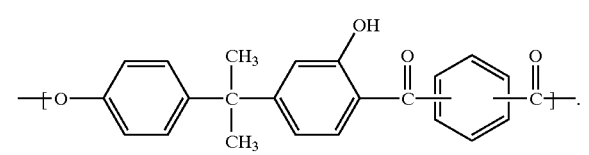

36. The retroreflective sheeting material of claim 35 wherein the fluorescent layer comprises a polymeric resin selected from the group consisting of polycarbonate, poly (ethylene terephthalate), poly(cyclohexanedimethanol-co-ethylene terephthalate), poly(cyclohexanedimethanol terephthalate), polyarylate, copolyestercarbonate, block copolymers containing arylate and carbonate blocks, polyurethanes, polystyrenes, acrylic polymers, polyvinyl chloride, and blends thereof.

37. The retroreflective sheeting material of claim 36 wherein the fluorescent layer comprises polyarylate.

38. The retroreflective sheeting material of claim 37 wherein the fluorescent dye comprises a dye selected from the group consisting of thioxanthene dyes.

39. The retroreflective sheeting material of claim 38 wherein said thioxanthene dye comprises Solvent Yellow 98.

40. The retroreflective sheeting material of claim 36 wherein the fluorescent layer comprises polycarbonate.

41. The retroreflective sheeting material of claim 40 wherein the fluorescent dye comprises a dye selected from the group consisting of benzothiazine, benzoxanthene, and thioxanthene dyes.

42. The sheeting material of claim 41 wherein the fluorescent dye comprises Solvent Yellow 98.

43. The retroreflective sheeting material of claim 36 wherein the fluorescent layer comprises poly (cyclohexanedimethanol-co-ethylene terephthalate).

44. The retroreflective sheeting material of claim 43 wherein the fluorescent dye comprises a dye selected from the group consisting of thioxanthene, perylene, perylene imide, perylene ester, and benzoxanthene dyes.

45. The sheeting material of claim 44 wherein the fluorescent dye comprises any one or more of Solvent Yellow 98, Lumo en F Yellow 083, Lumogen F Orange 240, and Lumogen F Red 300.

46. The retroreflective sheeting material of claim 36 wherein the fluorescent layer comprises a blend of polyarylate and polycarbonate.

47. The retroreflective sheeting material of claim 46 wherein the fluorescent dye comprises a dye selected from the group consisting of thioxanthene dyes.

48. The retroreflective sheeting material of claim 47 wherein said thioxanthene dye comprises Solvent Yellow 98.

49. The retroreflective sheeting material of claim 36 wherein the fluorescent layer comprises a blend of polyarylate and poly(ethylene terephthalate).

50. The retroreflective sheeting material of claim 49 wherein the fluorescent dye comprises a dye selected from the group consisting of thioxanthene dyes.

51. The sheeting material of claim 50 wherein the thioxanthene dye comprises Solvent Yellow 98.

52. The retroreflective sheeting material of claim 34 wherein said ultraviolet light screening layer and said fluorescent layer are disposed in laminar configuration, and said retroreflective elements are disposed on a surface of said fluorescent layer opposite said screening layer.

53. The retroreflective sheeting material of claim 34 further comprising a tie layer or adhesive between said ultraviolet light screening layer and said fluorescent layer.

54. The retroreflective sheeting material of claim 34 further comprising an adhesive between said ultraviolet light screening layer and said fluorescent layer.

55. The retroreflective sheeting material of claim 34 further comprising a third polymeric layer disposed over said ultraviolet light screening layer.

56. The retroreflective sheeting material of claim 34 further comprising a third polymeric layer disposed behind said fluorescent layer, and said retroreflective elements are disposed on the surface of the third polymeric layer opposite said fluorescent layer.

57. The retroreflective sheeting material of claim 56 further comprising a fourth polymeric layer disposed over said ultraviolet light screening layer.

58. The retroreflective sheeting material of claim 56 further comprising a tie layer or adhesive between said fluorescent layer and said ultraviolet light screening layer.

59. The retroreflective sheeting material of claim 34 wherein said ultraviolet light screening layer absorbs substantial amounts of light between wavelengths about 375–410 nanometers.

60. The retroreflective sheeting material of claim 34 wherein said ultraviolet light screening layer absorbs substantial amounts of light at wavelengths below about 375 nanometers.

61. An article comprising
   (a) a fluorescent polymeric layer comprising a fluorescent dye; and
   (b) an ultraviolet light screening layer comprising a polymeric resin, said polymeric resin comprising at least one polymer, or a mixture thereof, which either is, or is capable of undergoing rearrangement into a U.V. light absorbing polymer material.

62. The article of claim 61 wherein said polymer is or is capable of undergoing transformation into, a polymer that absorbs substantial amounts of light in a portion of the light spectrum between about 375–410 nm.

63. The article of claim 61 wherein said polymer is or is capable of undergoing transformation into, a polymer that absorbs substantial amounts of light in a portion of the light spectrum between about 290–375 nm.

64. The article of claim 61 wherein said polymer comprises a polyarylate.

* * * * *

Adverse Decisions in Interference

Patent No. 6,514,594, Guang-Xue Wei, Drew J. Buoni, and Kimberly A. Dockus, FLUORESCENT POLYMERIC ARTICLES HAVING SCREENING LAYER FORMED FROM U.V. LIGHT ABSORBING POLYMER, Interference No. 105,404, final judgment adverse to the patentees rendered, August 9, 2006, as to claims 1-64.